United States Patent [19]

Frizot et al.

[11] Patent Number: 4,696,786
[45] Date of Patent: Sep. 29, 1987

[54] PROCESS AND DEVICE FOR ADAPTING NEW UPPER INTERNAL EQUIPMENT TO THE VESSEL OF A PRESSURIZED WATER NUCLEAR REACTOR

[75] Inventors: Alain Frizot, Montcenis; Gerard Cadaureille, Saint Bonnet de Mure; Jean-Christophe Lalere, Lyons; Jean-Yves Machuron, Le Creusot, all of France

[73] Assignee: Framatome, Courbevoie, France

[21] Appl. No.: 890,225

[22] Filed: Jul. 29, 1986

[30] Foreign Application Priority Data

Aug. 2, 1985 [FR] France ............................... 85 11902

[51] Int. Cl.$^4$ ....................... G21C 17/00; G21C 19/00
[52] U.S. Cl. .................................... 376/245; 376/258; 376/260; 376/310; 33/502
[58] Field of Search ............... 376/260, 249, 258, 248, 376/245, 310; 33/502, 180 R, 533, 542, 543, 544, 1 H, 412

[56] References Cited

U.S. PATENT DOCUMENTS 4,197,652  4/1980  Qurnell et al. ...................... 376/245

FOREIGN PATENT DOCUMENTS 2098238  3/1972  France .
2262852  9/1975  France .
2368118  5/1978  France .

Primary Examiner—Deborah L. Kyle
Assistant Examiner—Daniel Wasil
Attorney, Agent, or Firm—Pollock, Vande Sande & Priddy

[57] ABSTRACT

With the reactor vessel (1) open and filled with water, and the core assemblies removed, means for measuring alignment (50) and means for measuring clearances (56, 58, 59) are mounted on the upper internal equipment (13). The upper equipment (13) is introduced into the vessel and is deposited on the lower equipment (3). Measurements of alignment are carried out and, if appropriate, the alignment is corrected by moving the upper internal equipment on the lower equipment (8). The clearances of the upper core plate are measured and, if appropriate, the upper internal equipment (13) is moved as a function of these measurements. The clearances around the centering and alignment pins are measured and adapters are machined and then fixed to the upper internal equipment (13) to reduce the clearances around the pins to a low, predetermined value. The invention also relates to the device for measuring and adapting the position of the internal equipment.

13 Claims, 12 Drawing Figures

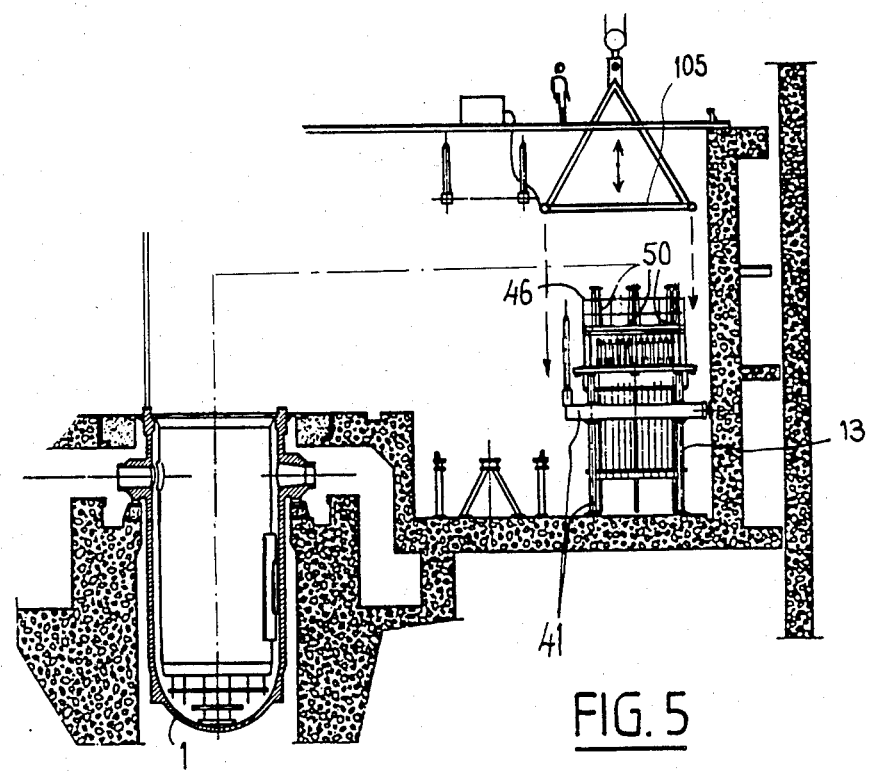

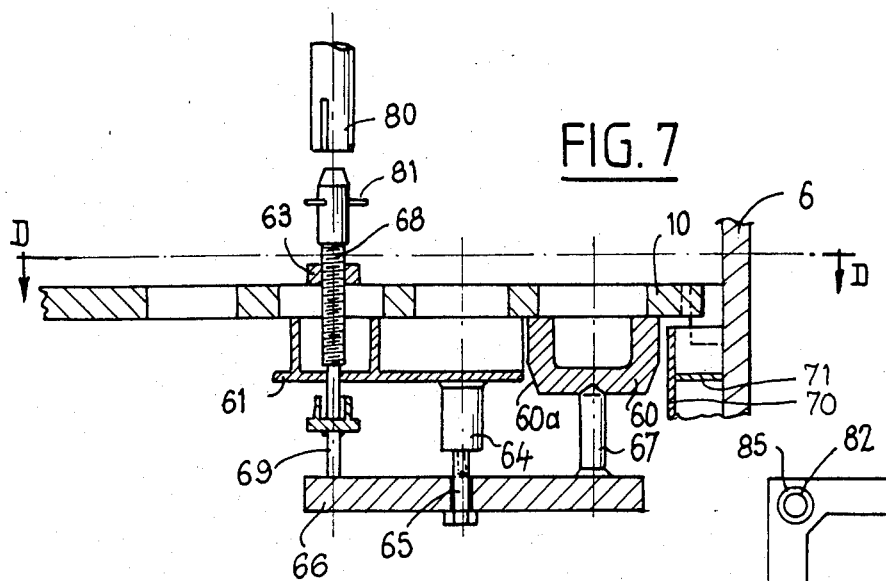
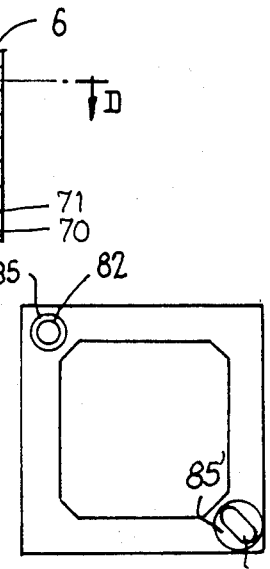
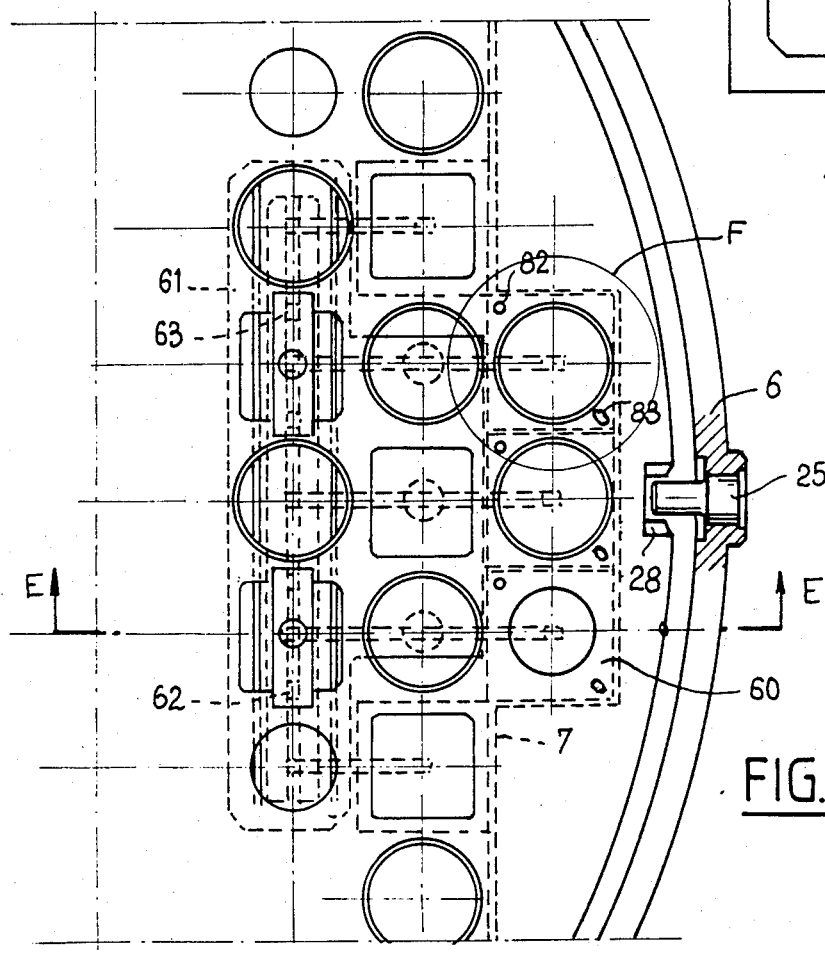

PROCESS AND DEVICE FOR ADAPTING NEW UPPER INTERNAL EQUIPMENT TO THE VESSEL OF A PRESSURIZED WATER NUCLEAR REACTOR

The invention relates to a process and a device for adapting new upper internal equipment to the vessel of a pressurized water nuclear reactor containing irradiated lower internal equipment.

Pressurized water nuclear reactors comprise a vessel of an overall cylindrical shape with a vertical axis, closed by a head and containing, on the one hand, the nuclear reactor core and, on the other hand, internal equipment providing, in particular, support and screening of the core and guidance of the control rods. This internal equipment is subdivided into lower internal equipment which comprises, in particular, the lower plate and the core support shell, and upper internal equipment which comprises, in particular, the upper core plate which forms the lower part of this equipment and an upper plate, as well as spacer columns which make it possible to ensure the rigid assembly of these two plates. The upper internal equipment also contains the set of guide tubes for the reactor control rods.

After the reactor has been operating for some time, the core must be reloaded and, to do this, access must be obtained to the upper part of the fuel assemblies forming this core. With the reactor stopped and cooled down, the vessel is opened and the upper internal equipment is removed and deposited in a specially arranged storage zone in the reactor pool. Checking and, if appropriate, repairs of the upper internal equipment are generally carried out during these core reloading operations. In fact, this internal equipment includes guide tubes for the control rods, containing guiding means which may be worn or distorted. Some of these guide tubes may then need to be replaced.

It may also be necessary to replace some of the pins used for fixing guide tubes to the upper core plate. However, these operations are difficult to carry out because they must be performed under water, in the reactor pool, on intensely irradiated equipment.

In some cases, the upper internal equipment may have been subjected to such wear or distortions that it is no longer possible to ensure perfect operation of the control rods, satisfactory guidance of which is no longer ensured. It may then be necessary to change the upper internal equipment as a whole, that is to say to replace it with new equipment.

Up to now, this operation has never been carried out because of the difficulties in adapting new upper internal equipment to the irradiated lower internal equipment remaining in the vessel.

In point of fact, this adaptation requires the implementation of complex operations of installing, adapting and carrying out measurements of the eouipment. Until now, these operations have always been carried out on new equipment at the time of the construction of the nuclear reactor.

It would be possible, of course, to replace both the upper internal equipment and the lower internal equipment, which is irradiated, with new equipment, but this very complex and very costly operation would be unwarranted because, generally, replacement of the lower internal equipment is unnecessary.

Thus, until the present there has been no known process and device permitting a replacement and an adaptation of the upper internal equipment, with the lower internal equipment being kept in place in the nuclear reactor vessel.

The aim of the invention is consequently to offer a process for adapting new upper internal equipment to the vessel of a pressurized water nuclear reactor containing irradiated lower internal equipment which comprises a horizontal lower plate and a reactor support shell as well as the screening for this core, while the upper internal equipment comprises an upper plate and a lower plate which forms the upper core plate, which are held together by vertical spacer columns, slots being provided on the peripheral part of the upper plate of the upper internal equipment and on the peripheral part of the upper core plate, in angularly offset positions, alignment pins being provided on the upper part of the lower internal equipment and centering pins being fixed to the core support shell, which are intended to cooperate with the slots in the upper plate of the lower internal equipment and with the slots in the upper core plate, respectively, for installing the upper internal equipment in the vessel, this process being such that it permits the replacement of only the upper internal equipment while the lower internal equipment is kept in the vessel.

To this end, with the vessel opened and filled with water, and the core assemblies having been removed:

means for measuring alignment and means for measuring clearance are mounted on the new upper internal equipment, together with a jig corresponding to the peripheral assemblies of the core under the upper core plate and skid blocks under the upper plate of the upper internal equipment, thruster devices are mounted in the region of the upper part of the lower internal equipment on the support flange for the vessel head and means for receiving alignment-measuring devices are mounted on the lower core plate, the upper internal equipment is introduced into the vessel so as to rest on the upper part of the lower internal equipment, through the intermediacy of the skid blocks, measurements of the vertical alignment of the upper internal equipment and of the lower internal equipment are carried out, the upper internal equipment is moved on the lower internal equipment, by the use of the thruster devices, to correct their respective alignment, as a function of the results of the alignment measurements, the clearances existing between the edge of the upper core plate and the opposing part of the core support shell are measured at four points spaced at angular intervals on the periphery of the plate, if appropriate, the upper internal equipment is moved again to correct the errors in the measured clearances, while a satisfactory alignment of the internal equipment is maintained, the clearances existing between, on the one hand, the alignment and centering pins and, on the other hand, the corresponding slots are measured, the upper internal equipment is withdrawn from the vessel, adapters machined to sizes which are determined by the measurements of clearances around the pins are fixed to the upper internal equipment, inside the slots, the upper internal equipment fitted with the adapters and only the alignment-measuring devices is reintroduced into the vessel, and the alignment of the upper internal equipment relative to the lower internal equipment is checked.

To make the invention properly understood, a description will now be given, with reference to the appended figures, of an embodiment of the process and of the device according to the invention.

FIG. 2b is a section along BB of FIG. 2a.

FIG. 3b is a top view of the alignment pin shown in FIG. 3a.

FIG. 5 is a general view showing the position of the upper internal equipment for fixing adapters to this equipment.

FIG. 6 is a plan view along DD of FIG. 7, of the upper core plate and of the jig fixed under this plate.

FIG. 7 is a view in section along EE in FIG. 6.

FIG. 8 is an enlarged view of the detail F in FIG. 6.

Figure 1:
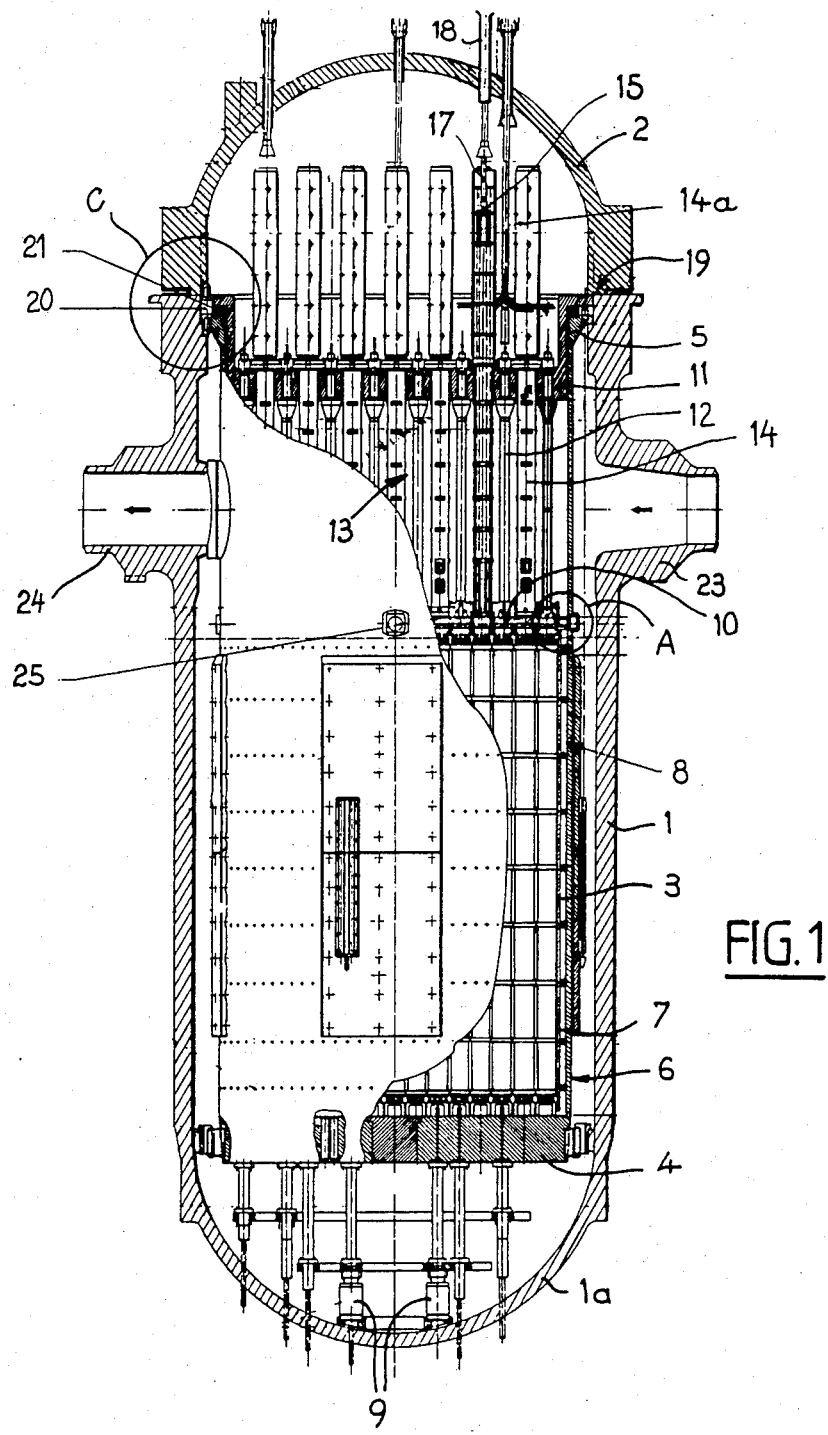
FIG. 1 is a sectional view of a vessel of a pressurized water nuclear reactor containing the lower internal equipment, the core and the upper internal equipment of the reactor.

FIG. 1 shows the vessel 1 of a pressurized water nuclear reactor, cylindrical in shape, comprising a convex bottom 1a and closed at its top part by a head 2, hemispherical in shape. The vessel 1 contains the reactor core 3 consisting of parallelepipedal, square-based assemblies, of a great height relative to the size of their cross-section and placed vertically side by side.

The core assemblies rest on the lower core support plate 4 which is very thick (for example in the region of 0.40 m) and fixed to the lower part of the core support shell 6 whose top part 5 forms a flange resting on an annular bearing surface machined into the inner wall of the flange of the vessel 1 on which the head 2 rests. The reactor core 3 resting on the lower core plate 4, inside the enclosure 6, is surrounded by screening 7 comprising vertical bearing plates which define the outline of the assemblies and horizontal strengthening plates bearing on the inner wall of the enclosure 6. The reactor core is thus supported within the vessel 1 by the shell 6 and the plate 4 which itself rests on the shock-absorber devices 9 resting on the vessel bottom 1a. The shock-absorber devices 9 are intended to absorb the shock of the fall of the core and to restrict its movement, should a rupture of the support shell 6 occur. This makes it possible to retain the possibility of inserting control rods into the core, even after a rupture of the core enclosure by which the latter is suspended in the vessel. The combination of the means for suspending and screening the core which has just been described forms the lower internal equipment of the reactor.

The upper internal equipment is arranged above the core and comprises a lower plate 10 forming the upper plate of the core, an upper plate 11 and spacers 12 responsible for the rigid assembly of the upper internal equipment. The lower parts of the guide tubes 14, whose upper parts comprise noncontinuous guidance means for the control rods and whose lower parts comprise continuous guidance means, are arranged between the upper core plate 10 and the upper plate 11 of the upper internal equipment. The upper parts 14a of the guide tubes 14 are arranged above the upper plate 11 of the upper internal equipment. Control rods such as 15 can be moved vertically by means of the drive shafts 17 travelling in the followers 18 passing through the vessel head 2.

The head 2 rests on the vessel 1 in the joint plane 19, the alignment between the vessel and the head being ensured by virtue of four vertical alignment pins 20 spaced at angular intervals on the periphery of the inner wall of the vessel, and engaged in corresponding machined parts of the vessel 1 and of the head 2. The upper internal equipment rests, through the intermediacy of a bearing member of the upper plate 11, on the upper part of the core support shell 6, itself resting on a part of the vessel; a shim ring 21 is inserted between the bearing member of the upper plate 11 of the upper internal equipment and the core support shell 6.

The support for the internal equipment is provided in a zone situated just below the joint plane 19, that is to say in the zone which receives the alignment pins 21. These alignment pins 21 will also be used to ensure the correct location of the internal equipment.

The guide tubes 14 of the upper internal equipment have openings in their walls to permit the circulation of the reactor cooling water which enters the vessel via a system of pipes such as pipe 23 and leaves this vessel via a system of pipes such as pipe 24. The cooling water passes vertically upwards through the core, with the result that a part of this cooling water is directed inside the guide tubes 14 whose side openings permit the cooling water to leave and to flow sideways.

Four centering pins 25 are fixed to the support shell 6 at points which are spaced at 90° angles. These centering pins, placed horizontally, project inwards, and the upper core plate has slots in positions which correspond to these pins.

Similarly, the peripheral bearing part of the upper plate 11 of the upper internal equipment comprises four slots in positions which correspond to the positions of the alignment pins 21. This pin-and-slot arrangement enables the upper internal equipment to be located accurately in the vessel, above the lower internal equipment.

It is obvious that the upper internal equipment must be placed above the core so as to conform to an extremely strict alignment between the guiding tubes 14 and the corresponding core assemblies 3 which are intended to receive the control rods. A very slight misalignment of these very tall assemblies might lead to difficulties in moving the control rods and in their dropping back into the core in the event of an emergency shutdown.

A very small clearance is therefore provided between the slots in the upper equipment plates and the corresponding pins, in order to obtain a very precise assembly. However, in the case of worn and irradiated lower internal equipment, onto which new upper internal equipment is to be placed, it is very difficult to achieve this installation while providing a very small fitting clearance. This may lead to jamming at the time of the fitting, with the result that the initial clearance must be increased. Whatever the circumstances, very good vertical alignment must be ensured between the upper and lower internal equipment, to obtain satisfactory operating conditions for the control rods; it is also necessary to retain a clearance which is small and is as uniform in size as possible between the upper core plate and the core enclosure, to obtain satisfactory flow conditions for the cooling water at the periphery and in the upper part of the core.

The process and the device according to the invention enable these requirements to be reconciled with the possibilities of mounting new internal equipment on irradiated equipment.

Figure 2B:
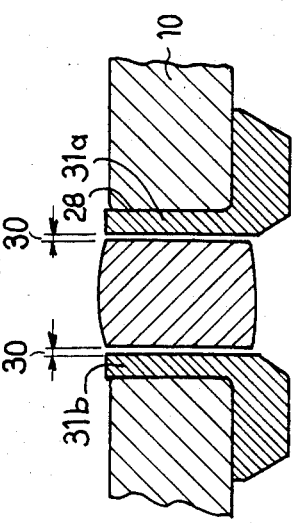
Figure 2A:
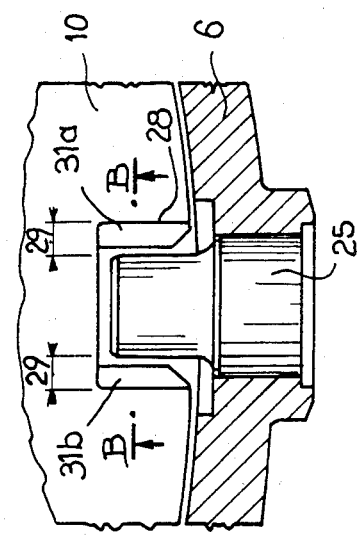
FIG. 2a is a top view of a pin for centering the lower internal equipment, that is to say of the detail A in FIG. 1.

FIGS. 2a and 2b show a centering pin 25 fixed onto the core enclosure 6 and entering a slot 28 machined in the upper core plate 10. FIG. 2a shows the initial clearances 29 between the pin 25 and the slot 28, on both sides of this pin 25.

Similarly, FIG. 2b shows the clearances 30 obtained on both sides of the pin, after the adapters 31a and 31b have been fixed to the edges o the slot 28, to the right and to the left of the pin 25. It will be seen that the adapters 31a and 31b are of sizes which can be determined so as to permit a perfect location of the upper internal equipment, by providing a final clearance which is low in value and accurately determined.

Figure 3A:
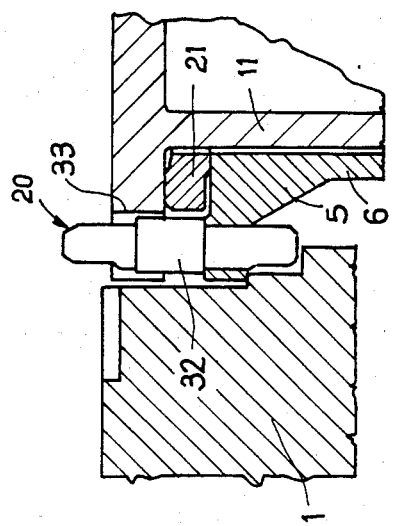
FIG. 3a is a larger scale view of the detail C in FIG. 1, showing a pin for aligning the vessel with its head.
Figure 3B:
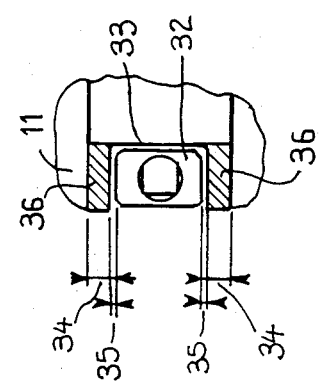

FIGS. 3a and 3b show a pin 20 which permits the alignment of the vessel 1 with the head 2 to be obtained by means of its end parts which are engaged in housings machined in this vessel and in this head, respectively. The pin 20 also makes it possible to ensure the relative positioning of the upper internal equpment and the lower internal equipment, since the bearing flange 5 of the lower internal equipment has an opening which engages the lower end part of the pin 20 which has, moreover, a central part 32 engaged in a slot 33 machined in the upper plate 11 of the upper internal equipment.

FIG. 3b shows that the initial clearances 34 between the part 32 of the pin 20 and the slot 33 are reduced, to give the final clearances 33 by virtue of adapters 36 which are specially machined to permit an accurate location of the upper internal equipment on the lower internal equipment, by providing a small and accurately determined clearance.

Figure 4:
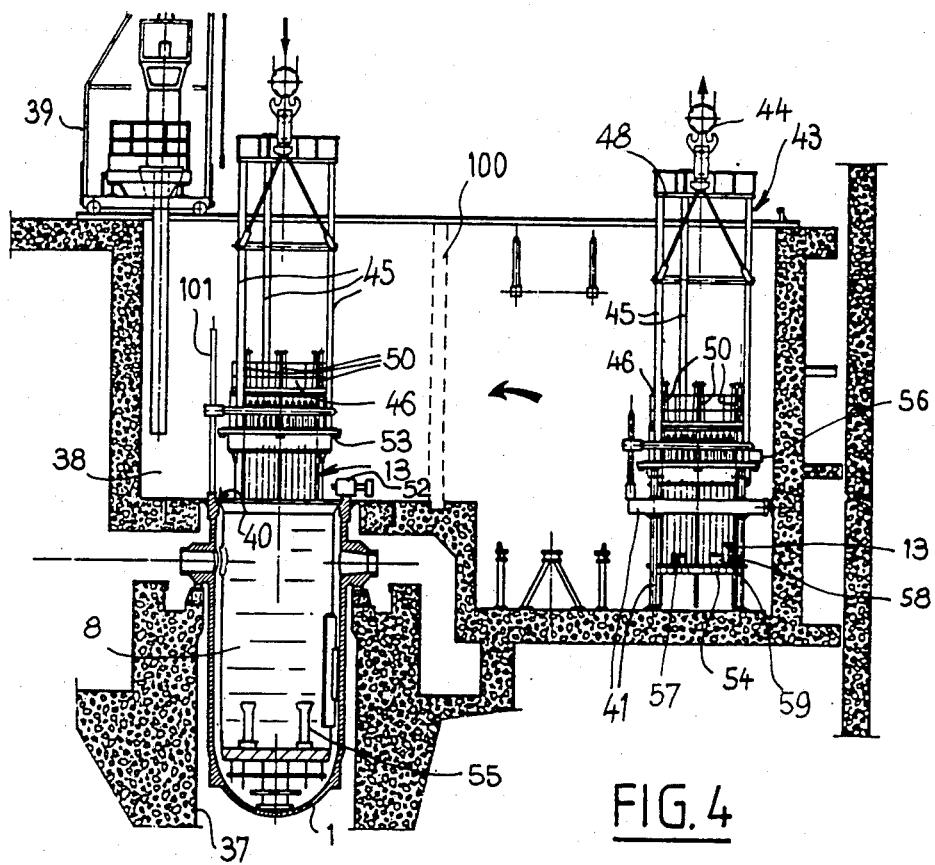
FIG. 4 is a diagrammatic general view showing the vessel, the reactor pool and the upper internal equipment in different positions during the operations for adaptation onto the lower internal equipment arranged in the vessel.

FIG. 4 shows the reactor vessel 1 placed in a vessel well 37 which forms part of the reactor structure and communicates with the pool 38 in its upper part. A charging machine 39 is capable of travelling above the pool.

To make use of the adaptation brocess according to the invention, during a reactor maintenance period, after a long perlod of operation, the vessel 1 is opened, its head 2 having been removed. This vessel is filled with water up to its upper level corresponding to the joint plane 40, while the pool is empty. The irradiated lower internal equipment, indicated generally by the reference 8 is kept inside the vessel.

The worn upper internal equipment has been withdrawn from the vessel beforehand, the reactor pool 38 being full of water at the time. This upper internal equipment, which is to be replaced, has then been removed and the reactor pool has been emptied; a support device 41 is placed in a part of the latter and is capable of receiving the new upper internal equipment which is indicated generally by reference 13.

The handling of the upper internal equipment is carried out by virtue of a handling tripod 43 suspended from the hook 44 of a powerful travelling crane. A handling tripod of this kind, which may be fixed to the upper internal equipment of a nuclear reactor to enable it to be handled between the reactor vessel and the zone for the storage of this equipment in the reactor pool is well known and comprises, in particular, three columns 45 and a footbridge 48 on which one or more operators can walk in order to handle equipment or make measurements. FIG. 4 shows the handling tripod with its second service footbridge 46 and the upper internal equipment 13 in a position situated inside the zone for storing the internal equipment in the reactor pool and in a position vertically above the vessel 1, at the time when the upper internal equipment is being introduced into this vessel.

In its position in the storage zone, on the support 41, the new internal equipment 13 delivered from the construction workshop is first of all equipped with the various components required for making use of the process according to the invention. To enable it to be adapted to the irradiated lower internal equipment 8 remaining in the vessel, this upper internal equipment 13 comprises, in contrast, only some of its guide tubes 14 or, if appropriate, no guide tubes. During the adapting operations, the internal equipment 13 must comprise at least its upper plate, its lower plate, that is to say the upper core plate, and the spacer columns which hold these plates together.

The removal of at least some of the guide tubes 14 from the upper internal equipment 13 enables, in particular, the measuring devices to be easily fixed to the internal equipment 13 placed in the reactor pool, which has been drained of water, on the storage support 41. No precautions are necessary, in fact, for working on this internal equipment 13 which has not been subjected to any irradiation. The measuring devices which are fixed to the new upper internal equipment comprise, firstly, a set of means for measuring alignment which consist of at least two and up to four vertical tubes 50 fixed in the upper internal equipment in positions corresponding to the positions of the guide tubes 14. Each of the tubes 50 includes a part arranged above the upper core plate or the lower plate of the upper internal equipment, and a lower part situated below the upper core plate, the length of which is substantially equal to the height of the core. This lower part terminates in an end member which is intended to fit into a receiving means 55 placed beforehand on the lower core plate, in the centre of an asembly location when the upper internal equipment is installed in the vessel for the measurements which enable it to be adapted. A metal wire is arranged along the axis of the tube 50, the lower end of this wire being fixed to the terminal part of the end member, and the upper end to a piece of equipment which is movable in a horizontal plane and integrally attached to the upper part of the tube 50. By virtue of an electrical control circuit, electrodes arranged in the region of the upper core plate make it possible to detect when the wire comes into successive contact with each of the electrodes, when its upper end is moved by virtue of the movable piece of equipment. Four electrodes are arranged around the axis of the tube 50 and the measurement of alignment consists in measuring the displacements of the movable piece of equipment in four directions, required to reach the four electrodes.

Figure 10:
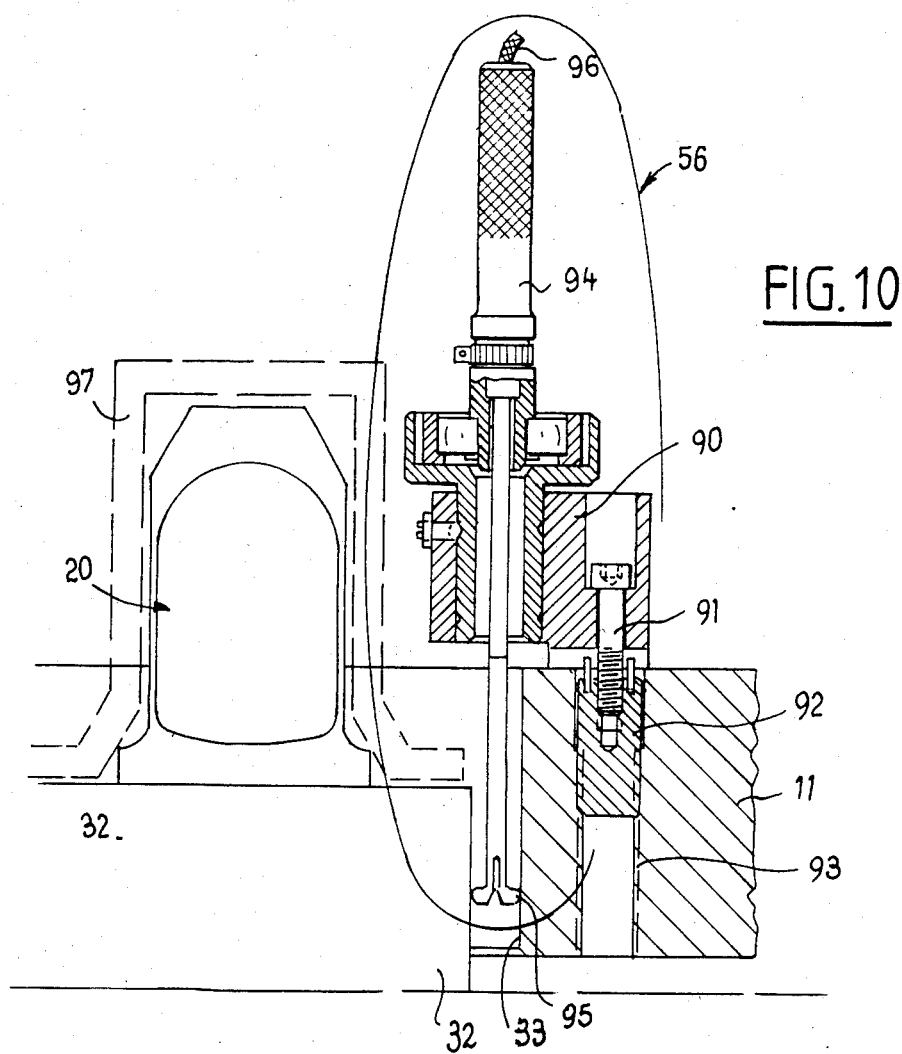
FIG. 10 is a view in section along GG in FIG. 9.
Figure 9:
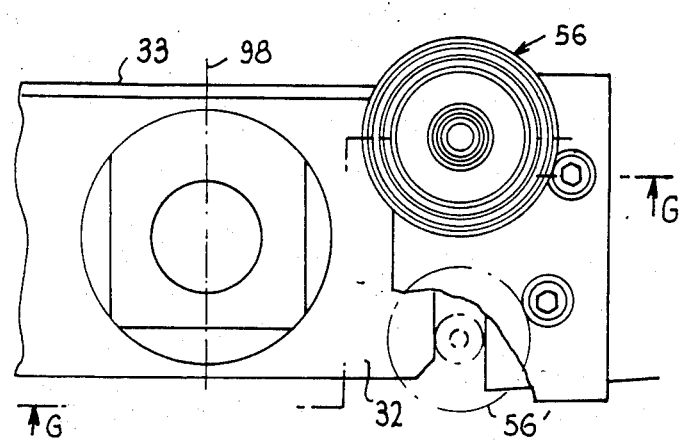
FIG. 9 is a top view of a means for measuring clearance around an alignment pin, in a working position.

Means for measuring clearance, which are of the type described with reference to FIG. 9 and 10, are also arranged on the new upper internal equipment; these devices are used to measure the clearances between the alignment pins and the corresponding slots in the upper plate of the upper internal equipment,and are either of the type having calibrated feeler blades of different thicknesses, the possibility or impossibility of introducing which blades into the clearance to be measured is detected, this second type of device being used for measuring the clearances between the upper core plate and the core enclosure, or alternatively of the type with a scriber point and a sensitive surface, this latter type being used for measuring the clearances around the centering pins. The principle of these devices is known and individual implementations are described in patent applications made by Framatome. Their operaion will be described later in connection with the use of the process of the invention. All these measuring devices may be remotely controlled from the footbridge 46 of the tripod 43, when the upper internal equipment is installed in the vessel, above the irradiated lower internal equipment.

Also mounted under the peripheral part of the upper plate of the equipment 13 which is arranged on its storage support are skid blocks of two types, some being skid blocks with ball bearings and others being smooth friction skid blocks. When the internal equipment is introduced into the vessel, the skid blocks rest on the bearing flange 5 of the lower internal equipment 8 so as to permit the upper internal equipment to move in any direction in a horizontal plane, relative to the lower internal equipment. To produce these movements, screw thruster devices 52 are placed in the open upper part of the vessel 1. Manipulation of these thruster devices which bear on a part of the upper internal equipment enables it to be moved in any direction in a horizontal plane or to be rotated about the vessel axis. The skid blocks 53 also include a locking device so that they can be immobilized.

Lastly, a jig 54 corresponding to the peripheral assemblies of the core is mounted under the upper core plate which forms the lower plate of the upper internal equipment, in a manner which will be described with reference to FIGS. 6, 7 and 8.

FIG. 6 shows the core enclosure 6 and the screening 7, which form part of the lower internal equipment 8. As can be seen in FIGS. 6 and 7, the screening 7 includes vertical plates 70 which form a container for the fuel assemblies arranged at the periphery of the core, and horizontal strengthening plates 71 of an appropriate shape so that they can bear against the inner surface of the core enclosure 6. The dummy 54 which is fixed under the core plate 10 consists of modular components 60 constructed in the shape of square-sectioned parallelepipedal casings the shape and the size of which correspond to those of a fuel assembly made to maximum machining tolerances and having maximum swelling due to irradiation. The method of fixing the components 60 will now be described with reference to FIGS. 6, 7 and 8. The fixing device shown enables five modules 60 which are arranged on the periphery of the core to be fixed simultaneously in locations close to a centering slot 28 inthe upper core plate 10.

This fixing device includes asupport 61 fitted flat underneath the upper core plate 10 by means of screws 62 engaged in two fixing strips 63. Fixed to the support 61 are five threaded sleeves 64 in which screws 65 engage to hold five support bars 66, each one having at its end a prop finger 67 intended to hold the component 60. Each of the strips 63 is also threaded to receive a screw 68 the lower end of which bears on a T-beam 69 fixed integrally to the set of support bars 66. A key 80 of the cock-key type makes it possible to turn the screws 68 which are fitted with two studs 81. The components 60 can thus be clamped to the upper cor plate 10 by making the support bars 66 swing on the screws 65, a small clearance being maintained between the strip and the screw, and the swing being obtained by the bearing of the end of the screw 68 on the T-beam 69. Obviously, turning the key 80 in a reverse direction unlocks the five components 60 which are held by the device which is described and illustrated.

FIG. 8 shows a component 60 seen from above, along F in FIG. 7. In its walls, the component 60 has, in the vicinity of the corners of its cross-section and along a diagonal, a first circular opening 82 and a second opening which is intended to receive a washer 85' having an oblong opening 83, the axis of which is directed along the common diagonal of the openings 82 and 83. These openings 82 and 83 are intended to cooperate with the positioning pins of the assembly which the component 60 is intended to replace. The openings 82 and 83 have diameters which are appreciably greater than the diameter of the corresponding centering pins, and at the time when the component 60 is installed under the upper core plate, a ring 85 ensures that the pin is centered in the opening 82, the other centering pin being located in the oblong opening 83 in the ring 85'.

After the installation of the component 60 which has been fitted flat against the upper core plate as described, the rings 85 and 85' are withdrawn, so that the component 60 retains some freedom of movement in all the directions common to the two openings and some freedom of rotation movement around the pins. Thus, at the time when the upper internal equipment is installed inside the vessel on the irradiated lower interal equipment, as will be described later, a degree or protection is retained in the event of a collision and the possibility of determining and measuring a movementis retained in the event that this component comes into frictional contact with the screening 7. To facilitate this engagement of the jig 54 in the screening, the modular components 60 also include a chamfered part 60a in their lower part.

In the case of difficulty in withdrawing the ring 85 after the modular component 60 has been installed, its withdrawal may be facilitated by slightly loosening the corresponding screw 68 which ensures that the component 60 is fitted flat underneath the upper core plate.

A device for measuring the clearance 56 at a pin 20 for aligning the head and the reactor vessel will now be described with reference to FIGS. 9 and 10. As described earlier with reference to FIGS. 3a and 3b, this alignment pin 20 comprises a central part 32, of a parallelepipedal shape which ensures the positioning of the upper plate 11 of the upper internal equipment, which has a slot 33 in the region of the part 32 of each of the four pins 20 for aligning the vessel with the reactor head.

The device 56, which will be briefly described below, makes it possible to monitor the clearance between the slot 33 and the part 32 of the pin. The device 56 includes a body 90, fixed by means of a locking screw 91 in a threaded plug 92, itself fixed in a passage opening 93 in the upper plate 11. On the body 9 is mounted an inner profile gauge 94 incorporating an induction sensor 95, the data from which are transmitted in the form of electrical signals to a measuring apparatus by means of an electric wire 96.

During the measurements, a protective lead cap 97 is placed above the upper part of the alignment pin 20, which may emit radiation.

As can be seen in FIG. 9, the device 56 may be placed successively in either of two positions 56 and 56', enabling clearance to be measured at two different places in the interstice between the pin 32 and the slot 33. A second device, identical to the device 56 and not shown, is placed in a position which is symmetrical to the position 56 or to the position 56' relative to the axis 98 of the slot 33. This device makes it possible to measure the clearances in two places along the width of the pin 32.

In each of the positions 56, 56' and equivalent positions, the device makes it possible to measure clearances at two different entry depths inside the interstice between the slot 33 and the pin 32. Eight clearance measurements, that is to say thirty-two measurements for the whole upper plate of the upper internal equipment are thus carried out for each of the keys.

The induction sensor 95 has a certain depth of travel in the space between the pin 32 and the slot 33 and a measurement is carried out at each end of this travel. Naturally, a larger number of measurements would be possible, but it has become apparent that only two depth measurements are sufficient to determine the relative slope between the plate 11 and the pin 32.

The process for adapting new internal equipment 13 to the irradiated lower internal equipment 8 retained in the vessel 1 of a nuclear reactor will now be described with reference to all the figures and especially to FIGS. 4 and 5.

In the initial state, the reactor is stopped, the vessel 1 is open and full of water, and the irradiated upper internal equipment has been removed together with the core assemblies, and the water has been drained from the reactor pool.

The new upper internal equipment is transported on its storage support 41 to the reactor pool. This inner equipment 13 contains only some of its guide tubes and, if appropriate, no guide tubes, so as to facilitate fitting of the measuring devices.

The handling tripod 43 is placed vertically above the upper internal equipment by means of the travelling crane and the footbridge 46 is installed. The clearance measuring devices 56, 58, 59, with their accessories such as a video camera 57 are then mounted. The four alignment measuring tubes 50 are then also mounted in the upper internal equipment and in the jig assembly 54 fixed under the upper core plate as described with reference FIGS. 6, 7 and 8. The tripod for lifting the upper internal equipment, equipped with the footbridge 46, is then bolted to this internal equipment and the skid blocks 53 of the upper internal equipment are fixed under the upper plate flange 11.

In parallel, four screw displacement devices 52 are fixed to the upper part of the vessel 1 and four members 55 for receiving the alignment measuring devices 50 are fixed to the lower core plate.

In the case where the irradiated internal equipment is still in the reactor pool at the time when the procedure used begins, it is kept under water by virtue of the presence of a caisson 100 and the measuring devices and the jig 54 are mounted on the new internal equipment in a storage position above the level bf the reactor pool.

In all cases, when the various fittings listed above have been carried out on the new upper internal equipment, the latter is transported, by means of the handling tripod, into the vessel, as shown on the left hand side of FIG. 4. When the new internal equipment 13 being lowered into the vessel, its guidance is ensured by the vessel head guide columns 101 installed on the vessel. When the upper internal equipment is being lowered into the vessel, the readings of a tensometer associated with the lifting device are monitored in order to detect any load reduction and to act immediately on the hook of the lifting crane.

The placing of the upper internal equipment is terminated when the lockable skid blocks 53 come to bear on the upper flange 5 of the lower internal equipment.

The alignment measuring tubes 50 installed in the upper internal equipment are then lowered into a working position, where their lower end member enters the receiving means 55 installed in the lower core plate. Measurements of alignment error are then carried out by moving the wire of the alignment devices from the upper part of the tubes 50, on the platform 46, in four directions. The errors are measured as the distance travelled before the wire comes into electrical contact with the electrodes situated in the region of the upper core plate. The measurements are made for the four tubes 50, each of whose positions corresponds to a position of a guide tube and of the corresponding assembly.

Some degree of tolerance is permitted when the alignments are made and if the measured alignment errors are outside this tolerance, the skid bocks 53 are unlocked and the upper internal equipment is moved in its horizontal support plane on the support flange of the lower internal equipment, by means of the screw thruster devices 52. The alignments measured by the devices 50 are thus corrected in order to reduce them to permissible values.

The clearances present between the edge of the upper core plate 10 and the part of the core support shell situated opposite this plate are then measured. This part of the core support shell includes a machined coating or buttering which makes it possibe to maintain, when the upper internal equipment is accurately located a small, constant and predetermined spacing for the flow of reactor cooling water to the periphery, as it leaves the core.

This measurement is made remotely from the footbridge 46 of the device, by virtue of means 59 consisting of calibrated feeler blades, whose entry or non-entry into the clearance present is checked by means of the video camera.

It may then be necessary to move the internal equipment again, after the skid blocks 53 have been unlocked, in order to correct the errors between the measured clearances. In this operatlon, however, the alignments are taken into account so that they are kept within the permissible tolerances.

Next, measurements are made from the platform of, on the one hand, the clearance between the alignment pins and the corresponding slots in the upper plate 11, by virtue of the device 56 and, on the other hand, of the clearance between the centering pins 25 and the corresponding slots in the upper core plate 10, by virtue of the scribing device 58 manipulated from the platform 46.

These data relating to the clearance measurements are used, together with the measurements of alignment, to carry out the machining of the adapters such as 31a, 31b shown in FIGS. 2a and 2b, and such as 36, shown in FIG. 3b. These adapters comprise a part for fixing under the upper core plate or under the upper plate of the upper internal equipment 11, and a part intended to correct the clearance between the pin and the corresponding plate to the required final value 30 or 35. Before the step of producing the adapters, the upper internal equipment 13 is withdrawn from the vessel and placed on its support 41 in the reactor pool, as can be seen in FIG. 5. A spraying rack 105 is then placed above the upper internal equipment and then moved along this equipment to decontaminate it. Machining of the adapter parts the thickness of which is generally not uniform is determined by the measurements of clearance around the alignment pins and the centering pins, with the required final clearance being taken into account. The permissible tolerances in respect of alignment must also be taken into account when these adapters are made.

When the adapters have been completed, they may be placed and fixed in position in the slots of the corresponding plates. The measuring devices fixed to the upper internal equipment are also dismantled, except for the alignment measuring devices 50 and for the dummy 54, which are kept in place.

A second operation of fitting the upper internal equipment in the vessel is then carried out by means of the handling tripod, the installation of the equipment being ensured by virtue of the adapters fixed in the slots in the plates. The alignment of the upper and lower internal equipment is then checked by means of the devices 50, it being necessary for this alignment to remain within the required tolerances. The final tolerances obtained between each of the alignment pins 20 and the corresponding adapters 36 are also checked.

These final tests make it possble to determine definitively whether the installation of the upper internal equipment in the vessel has been carried out in a satisfactory manner.

It appears that the process and the device according to the invention permit the installation of new upper internal equipment on irradiated lower internal equipment kept in the vessel of a pressurized water nuclear reactor, while the required tolerances are maintained, in respect of the alignments responsible for the proper operation of the control rods and the various fitting tolerances between the upper plate and the core enclosure on the one hand, and between the alignment and centering pins and the slots provided in the plates and situated in the region of these pins, on the other hand. Any danger of jamming when the upper internal equipment is presented on the lower internal equipment remaining in the vessel is also avoided by the provision of adequate clearance which will subsequently be modified to the required final clearance for the second presentation.

The invention is not restricted to the embodiment which has been described. Thus, devices for measuring alignment or devices for measuring clearance other than those which have been described may be imagined. It is also possible to imagine other methods of mounting the jig of the peripheral part of the core on the upper internal equipment.

Finally, other ways of implementing some steps of process may be imagined, as a function of the operating requirements or of the structure of the nuclear power station incorporating the reactor, in which the upper internal equipment is being changed.

We claim:

1. Process for adapting new upper internal equipment to the vessel of a pressurized water nuclear reactor containing irradiated lower internal equipment (8) which comprises a horizontal lower plate (4), a core support shell (6) as well as the core screening (7), while the upper internal equipment (13) comprises an upper core plate (11) and a lower plate (10) which forms an upper core plate, which are held together by vertical spacer columns (12), slots (33, 28) being provided on the peripheral part of the upper plate (11) of the upper internal equipment and on the peripheral parts of the upper core plate (10), in angularly offset positions, alignment pins (20) being orovided at the upper part of the lower internal equipment (8) and centering pins (25) being fixed to the core support shell (6) which are intended to cooperate with the slots (33) in the upper plate (11) of the upper internal equipment and with the slots (28) in the upper core plate (10), respectively, for installing the upper internal equipment (3) in the vessel:

with the vessel (1) opened and filled with water, and the core assemblies having been removed, the process comprising:

means for measuring alignment (50) and means for measuring clearance (56, 58, 59) are mounted on the new upper internal equipment (13), together with a jig (54) corresponding to the peripheral assemblies of the core under the upper core plate (10) and skidblocks (53) under the upper plate (11) of the upper internal equipment, thruster devices (52) are mounted in the region of the upper part of the lower internal equipment (8) on the support flange for the vessel head and means (55) for receiving the alignment measuring devices (50) are mounted on the lower core plate (4), the upper internal equioment (13) is introduced into the vessel (1) so as to rest on the upper part of the lower internal equipment (8), through the intermediacy of the skid blocks (53), measurements of the vertical alignment of the upper internal equipment (13) and of the lower internal equipment (8) are carried out, the upper internal equipment (13) is moved on the lower internal equipment (8) by the use of the thruster devices (52) to correct their respective alignment, as a function of the results of the alignment measurements, the clearances existing between the edge of the upper core plate (10) and the opposing part of the core support shell (6) are measured at four points spaced at equal angular intervals on the periphery of the plate (10), if appropriate, the upper internal equipment (13) is moved again to correct the errors in the measured clearances, while a satisfactory alignment of the internal equipment (13, 8) is maintained, the clearances existing between, on the one hand, the alignment (20) and centering (25) pins and, on the other hand the corresponding slots (33, 28) are measured, the upper internal equipment (13) is withdrawn from the vessel (1), adapters (31, 31b, 36) machined to sizes which are determined by the measurements of clearances around the pins (21, 25) are fixed to the upper internal equipment (13), inside the slots (28, 33), the upper internal equipment (13) fitted with the adapters (31a, 31b, 36) and only the alignment-measuring devices (50) is reintroduced into the vessel (1), and the alignment of the upper internal equipment (13) relative to the lower internal equipment (8) is checked.

2. Adaptation process according to claim 1, wherein the upper internal equipment (13) is decontaminated by spraying it with water after it has been withdrawn from the vessel and placed in a storage zone situated in the reactor pool and before the adapters (31a, 31b, 36) are attached to it.

3. Adaptation process according to either of claims 1 or 2, wherein the mounting of the measuring devices (50, 56, 58, 59), of the jig (54) and of the skid blocks (53) on the upper internal equipment (13) is carried out in a storage zone situated in the reactor pool.

4. Adaptation process according to either of claims 1 or 2, wherein the mounting of the measurement means (50, 56, 58, 59) of the jig (54) and of the skid blocks (53) on the upper internal equipment (13) is carried out in a zone situated above the reactor pool.

5. Device for adapting new upper internal equipment (13) to the vessel (1) of a pressurized water nuclear reactor containing irradiated lower internal equipment (8) which comprises a horizontal lower plate (4), a core support shell (6) and core screening (7), while the upper internal equipment (13) comprises an upper plate (11) and a lower plate (10) which forms the upper core plate of the core, which are held together by vertical spacer columns (12), slots (28, 33) being provided at the peripheral part of the upper plate (11) of the upper internal equipment (13) and at the peripheral part of the upper core plate (10), in angularly offset positions, alignment pins (20) being provided at the upper part of the lower internal equipment (8) and centering pins (25) being fixed to the core support shell (6), which are intended to cooperate with the slots (33) in the upper plate (11) of the upper internal equipment and with the slots (28) in the upper core plate (10), respectively, for installing the upper internal equipment in the vessel, which device comprises;

a means for handling (43) the upper internal equipment and a platform (46) mounted in a removable manner on the handling means (43), means for measuring alignment (50) and means for measuring clearance (56, 58, 59) fixed to the platform (46) and introduced inside the internal equipment (13), a jig (54) corresponding to the peripheral assemblies the core, fixed under the upper core plate (10), skid blocks (53) comprising a locking mechanism fixed under the support flange of the upper plate (11) of the upper internal equipment (13), and thruster devices (52) applying forces in a horizontal plane, which are fixed to the upper part of the vessel (1) flange.

6. Adaptation device according to claim 5, wherein the alignment-measuring devices (50) are of the type comprising a metal alignment wire one end of which is fixed and the other can move in at least four directions in a horizontal plane and electrodes placed around the wire in an intermediate part between these ends to permit the recording of the movements of the end of the wire which bring its intermediate part into contact with each of the electrodes.

7. Adaptation device according to claim 5, which comprises a clearance-measuring device (56) consisting of a plurality of inner profile gauges including a strain gauge, which are fixed to the upper plate (11) of the upper internal equipment (13) in the vicinity of each of the slots (33) and of the corresponding alignment pins (32), for measuring the clearances between the pin (32) and the corresponding slot (33) in various positions along the two parallel vertical faces of the pin (32) arranged opposite the sides of the slot (33).

8. Adaptation device according to claim 5, which comprises a clearance-measuring device (58) of the type in which a sensitive plate is scribed by a stylus which can be manipulated from the platform (46), so as to measure the clearances around the centering pins (25).

9. Adaptation device according to claim 5, which comprises a clearance-measuring device (59) of the type with calibrated feeler blades, which is associated with a video camera (57), the blades being capable of being manipulated from the platform (46) for measuring the clearance between the upper core plate (10) and the core enclosure (6), by checking the possibility of introducing a blade into the space between the plate (10) and the enclosure (6).

10. Adaptation device according to claim 5, wherein the jig (54) consists of components (60) in the shape of casings whose cross-section corresponds to the cross-section of an assembly having the maximum machining dimensions and having a maximum swelling due to irradiation, which are maintained under the upper core plate (10) by a removable fixing device.

11. Adaptation device according to claim 10, wherein the removable fixing device for the jig (54) components (60) permits at least two components (60) to be fixed simultaneously.

12. Adaptation device according to claim 11, wherein the removable fixing device comprises a support (61) fixed rigidly under the upper core plate (10), a clamping bar (66) associated with each of the components (60) to be fixed, which is fitted with a prop finger (67) and fixed to the support (61) so as to retain a possibility of pivoting about a horizontal axis, as well as at least one screw (68) for actuating the bars (66) for fixing or dismantling the components (60), this screw (68) passing through the upper core plate (10) and having means (81), above the upper core plate (10), which enable it to be turned by means of a tool (80).

13. Adaptation device according to claim 10, wherein each of the square-sectioned components (60) in the shape of a casing comprises, in its walls, along a diagonal of its cross-section, a circular fixing opening and an oblong opening for fixing onto the assembly fixing pins which are placed under the upper core plate (10), the circlular opening (82) having a diameter which is greater than the corresponding pins and which is intended to receive a centering ring (85) at the time when the component (60) is fixed on the corresponding ring (85) being removable so as to endow the components (60) with the possibility of limited movement.

* * * * *